United States Patent
Fujieda et al.

(10) Patent No.: US 9,708,460 B2
(45) Date of Patent: *Jul. 18, 2017

(54) COMPOSITE MATERIAL

(71) Applicant: Hitachi, Ltd., Tokyo (JP)

(72) Inventors: Tadashi Fujieda, Tokyo (JP); Takashi Naito, Tokyo (JP); Takuya Aoyagi, Tokyo (JP); Yuichi Sawai, Tokyo (JP); Hajime Murakami, Tokyo (JP); Hiroshi Yoshida, Tokyo (JP); Akihiro Miyauchi, Tokyo (JP); Masahiko Ogino, Tokyo (JP)

(73) Assignee: HITACHI, LTD., Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 14/368,479

(22) PCT Filed: Nov. 1, 2012

(86) PCT No.: PCT/JP2012/078276
§ 371 (c)(1),
(2) Date: Jun. 24, 2014

(87) PCT Pub. No.: WO2013/099436
PCT Pub. Date: Jul. 4, 2013

(65) Prior Publication Data
US 2014/0334937 A1   Nov. 13, 2014

(30) Foreign Application Priority Data
Dec. 26, 2011 (JP) ............. 2011-282623

(51) Int. Cl.
C03C 3/12 (2006.01)
C03C 3/21 (2006.01)
(Continued)

(52) U.S. Cl.
CPC ............. $C08K\ 3/40$ (2013.01); $C03C\ 3/122$ (2013.01); $C03C\ 3/21$ (2013.01); $C03C\ 13/00$ (2013.01);
(Continued)

(58) Field of Classification Search
CPC .................. C08K 3/40; C09D 125/06
See application file for complete search history.

(56) References Cited

U.S. PATENT DOCUMENTS 3,798,114 A * 3/1974 Chvatal ............... C03C 3/12
428/433
5,334,558 A   8/1994 Dietz et al.
(Continued)

FOREIGN PATENT DOCUMENTS

DE   4128804 A1 * 3/1993 ............ C03C 3/122
JP   03-140337 A   6/1991
(Continued)

Primary Examiner — Randy Gulakowski
Assistant Examiner — Ha S Nguyen
(74) Attorney, Agent, or Firm — Volpe and Koenig, P.C.

(57) ABSTRACT

Mechanical strength of a composite material is enhanced by a simple process. In a composite material comprising a resin or a rubber and an oxide glass, the resin or the rubber is dispersed in the oxide glass, or the oxide glass is dispersed in the resin or the rubber, and the oxide glass is softened and fluidized by heating at or lower than a heat decomposition temperature of the resin or the rubber.

10 Claims, 2 Drawing Sheets

(51) Int. Cl.
   *C03C 14/00*   (2006.01)
   *C03C 8/08*    (2006.01)
   *C08J 5/10*    (2006.01)
   *C08K 3/40*    (2006.01)
   *F03D 1/06*    (2006.01)
   *C09D 125/06*  (2006.01)
   *C03C 13/00*   (2006.01)

(52) U.S. Cl.
   CPC ............ *C03C 14/00* (2013.01); *C08J 5/10* (2013.01); *C09D 125/06* (2013.01); *F03D 1/0675* (2013.01); *Y02E 10/721* (2013.01)

(56) References Cited

U.S. PATENT DOCUMENTS

| | | | |
|---|---|---|---|
| 7,629,279 | B2 | 12/2009 | Tanaka et al. |
| 8,080,490 | B2 | 12/2011 | Fechner et al. |
| 2003/0149160 | A1 | 8/2003 | Greiner et al. |
| 2006/0142413 | A1 | 6/2006 | Zimmer et al. |
| 2009/0064717 | A1* | 3/2009 | Son ............... C03C 8/04 65/42 |
| 2011/0306257 | A1* | 12/2011 | Arpin ............. B32B 27/04 442/131 |

FOREIGN PATENT DOCUMENTS

| | | | |
|---|---|---|---|
| JP | 07-309970 | A | 11/1995 |
| JP | 08-502468 | A | 3/1996 |
| JP | 08059295 | A * | 3/1996 |
| JP | 2001-064524 | A | 3/2001 |
| JP | 2001064524 | A * | 3/2001 |
| JP | 2003-516878 | A | 5/2003 |
| JP | 2005-008488 | A | 1/2005 |
| JP | 2006-518697 | A | 8/2006 |
| JP | 2006-520311 | A | 9/2006 |
| JP | 2013-032255 | A | 2/2013 |
| JP | 2013-132756 | A | 7/2013 |
| JP | 2013-132757 | A | 7/2013 |
| JP | 2013-133343 | A | 7/2013 |
| WO | 2010/044413 | A1 | 4/2010 |

* cited by examiner

COMPOSITE MATERIAL

TECHNICAL FIELD

The present invention relates to a composite material in which a glass and a resin or a rubber are mixed.

BACKGROUND ART

Resins and rubbers (hereinafter referred to as resin, etc.) are light in weight and can be molded easily at a relatively low temperature compared with other materials but, on the other hand, they involve such drawbacks that they are deteriorated remarkably by UV-light and are poor in mechanical strength and gas barrier property. On the other hand, while glass is excellent in chemical stability and has high mechanical strength or gas barrier property compared with the resin and the rubber but it has a drawback of tending to cause brittle fracture and being heavy in weight.

Accordingly, composite materials comprising resins and glass to compensate their respective drawbacks have been invented as typically represented by glass fiber reinforced plastics (GFRP). However, since adhesion between an oxide such as the glass and the resin is low, the strength at the boundary between them predominates the mechanical strength of the composite material.

For example, a patent literature 1 discloses that a sizing agent containing a silane coupling agent and a resin is coated on the surface of glass fibers.

CITATION LIST

Patent Literature

Patent Literature 1: Japanese Unexamined Patent Application Publication No. 2005-8488

SUMMARY OF INVENTION

Technical Problem

However, the glass fiber reinforced plastic of the patent literature 1 involves a subject that a complicate surface treatment has to be applied to the glass when the resin and the glass are composited.

The present invention intends to enhance the mechanical strength of the composite material by a simple process.

Solution to Problem

For attaining the object described above, the present invention provides a composite material comprising a resin or a rubber and an oxide glass characterized in that the resin or the rubber is dispersed in the oxide glass, or the oxide glass is dispersed in the resin or the rubber and the oxide glass is softened and fluidized by heating at or lower than a heat decomposition temperature of the resin or the rubber.

Advantageous Effects of Invention

According to the present invention, a mechanical strength of a composite material can be improved by a simple process.

DESCRIPTION OF EMBODIMENTS

Figure 1:
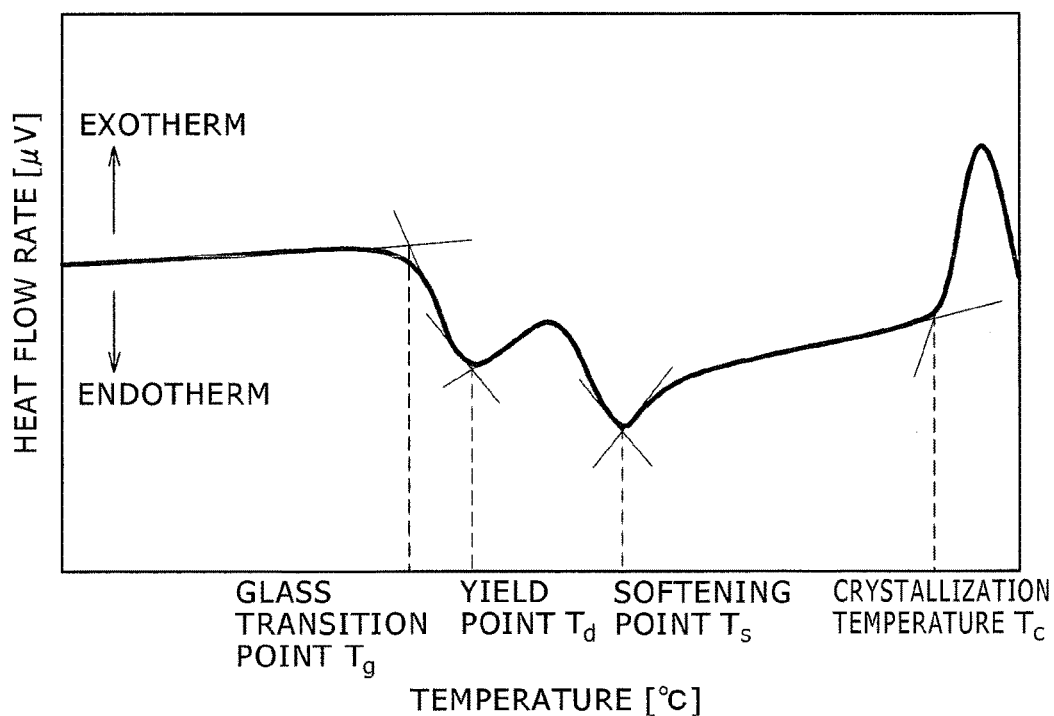
[FIG. 1] illustrates a differential thermoanalysis curve of glass.

The present invention is to be described specifically. The present invention relates to a composite material comprising a resin or a rubber (hereinafter referred to as resin, etc.) and an oxide glass in which the resin, etc. are dispersed in the glass, or the glass is dispersed in the resin, etc. By heating the composite material, the glass is softened and fluidized (melted) at a temperature of a heat decomposition temperature or lower of the resin, etc. Since the boundary between the once melted glass and the resin is smooth, adhesion between the resin and the glass is increased compared with a case where glass particles are merely dispersed in the resin. The heat decomposition temperature is a temperature at which reduction of weight is started by heating, which is thermo-gravitationally measured (TG).

In the oxide glass forming the composite material of the invention, a softening point can be lowered by incorporating two or more of Te, P, and V and Ag without using elements which are deleterious to environments such as Pb and Bi. Since the softening point of the glass can be lowered to a temperature at which the resin, etc. are decomposed or lower, the glass can be softened and fluidized without greatly decomposing the resin of the composite material in which the glass and the resin are mixed together, and can be integrated with the resin. Accordingly, adhesion at the boundary between the glass and the resin can be increased to enhance the mechanical strength of the composite material. In addition, the composite material of the invention can be manufactured by a simple process of merely mixing the glass particles and the resin and heating them. Further, the weather resistance and the mechanical strength are enhanced and the weight can be reduced when compared with the material consisting only of the glass.

Further, it is preferred that the oxide glass contains at least $Ag_2O$, $V_2O_5$, and $TeO_2$ and the contents of $Ag_2O$, $V_2O_5$, and $TeO_2$ in total is 75 mass % or more. $Ag_2O$ and $TeO_2$ are ingredients that contribute to the lowering of the softening point, and the glass softening point of the invention corresponds substantially to the contents of $Ag_2O$ and $TeO_2$. $V_2O_5$ suppresses precipitation of metallic Ag from $Ag_2O$ in the glass and contributes to the improvement of the thermal stability of the glass. Within the compositional range described above, the softening point of the glass (peak temperature at the second endothermic peak in the temperature elevational process of DTA) can be lowered to 320° C. or lower and sufficient thermal stability can be ensured.

A specific composition of the oxide glass preferably comprises 10 to 60 mass % of $Ag_2O$, 5 to 65 mass % of $V_2O_5$, and 15 to 50 mass % of $TeO_2$. In the present invention, when it is described, for example, as 10 to 60 mass %, this means 10 mass % or more and 60 mass % or less. Since precipitation of the metallic Ag from $Ag_2O$ is suppressed by the addition of $V_2O_5$, the amount of $Ag_2O$ can be increased to lower the softening point further and improve the chemical strength of the glass (for example, moisture resistance). Within such a compositional range described above, better moisture resistance than that of conventional low melting lead-free glass can be ensured.

As the Ag$_2$O content increases to 2.6 times than the V$_2$O$_5$ content, the softening point Ts is no more lowered so much even when Ag$_2$O is added further. In addition, the glass tends to be crystallized. Accordingly, the Ag$_2$O content is preferably 2.6 times or less of the V$_2$O$_5$ content.

Further, the oxide glass is excellent in the moisture resistance when it comprises 10 to 60 mass % of Ag$_2$O, 5 to 65 mass % of V$_2$O$_5$, and 15 to 50 mass % of TeO$_2$ in which the contents of Ag$_2$O, V$_2$O$_5$, and TeO$_2$ in total is 75 mass % or more and the sum of the Ag$_2$O content and the V2O5 content is from 40 to 80 mass %.

EXAMPLE 1

Glasses having various compositions were prepared and softening points and moisture resistance of the glasses were investigated in this example.
(Preparation of Glass)
Glasses having the compositions shown in Table 1 (SPL-01 to 25) were prepared. The composition in the table is represented by mass ratio of each of the ingredients in terms of oxide. As the starting material, oxide powders (purity: 99.9%) manufactured by Kojundo Chemical Laboratory Co., Ltd. were used. For some samples, Ba (PO$_3$)$_2$ (barium phosphate manufactured by Lasa Industries Ltd.) was used as a Ba source and a P source.

Respective starting material powders were mixed in the mass ratio shown in Table 1 and charged in platinum crucibles. When the ratio of Ag$_2$O in the starting material was 40 mass % or more, an alumina crucible was used. In the mixing, starting powders were mixed in the crucible by using a metal spoon for avoiding excess moisture absorption to them.

The crucible charged with the powder mixture of starting materials was placed in a glass melting furnace and heated to melt the mixture. Temperature was elevated at an elevation rate of 10° C./min and the molten glass was kept for one hour while stirring at a set temperature (700 to 900° C.). Then, the crucible was taken out of the glass melting furnace and the glass was cast in a graphite casting mold which had been previously heated to 150° C. Then, the cast glass was transferred to a stress relieving furnace which had been previously heated to a stress relieving temperature and, after relieving the stress by keeping for one hour, the glass was cooled to a room temperature at a rate of 1° C./min. The glass cooled to a room temperature was pulverized to prepare glass powders having the compositions shown in the table.
(Evaluation of Softening Point)
For each of the glass powders obtained as described above, softening point Ts was measured by differential thermal analysis (DTA). In DTA measurement, masses of a reference sample (α-alumina) and samples to be measured were set to 650 mg respectively, and temperature was elevated at an elevation rate of 5° C./min in atmospheric air and the peak temperature at a second endothermic peak was determined as a softening point Ts (refer to FIG. 1). The result is shown together in Table 1.

TABLE 1

| | Glass composition (mass %) | | | | | | | | Characteristics temperature of glass | | |
| | | | | | | | | | Glass transition point | Yield point | Glass softening point |
| Sample No. | V$_2$O$_5$ | Ag$_2$O | TeO$_2$ | P$_2$O$_5$ | BaO | WO$_3$ | Fe$_2$O$_3$ | Sb$_2$O$_3$ | | | |
|---|---|---|---|---|---|---|---|---|---|---|---|
| SPL-01 | 30.0 | 30 | 30.0 | 4.8 | 5.2 | | | | 222 | 246 | 277 |
| SPL-02 | 30.0 | 30 | 30.0 | 5.0 | | 5 | | | 230 | 246 | 284 |
| SPL-03 | 25.0 | 30 | 30.0 | 4.8 | 5.2 | 5 | | | 223 | 245 | 285 |
| SPL-04 | 25.0 | 30 | 30.0 | 7.2 | 7.8 | | | | 228 | 251 | 295 |
| SPL-05 | 30.0 | 25 | 30.0 | 4.8 | 5.2 | 5 | | | 236 | 262 | 295 |
| SPL-06 | 25 | 50 | 25 | | | | | | 204 | 228 | 273 |
| SPL-07 | 30.0 | 30 | 30.0 | 5.0 | | | 5 | | 235 | 262 | 300 |
| SPL-08 | 25.0 | 30 | 30.0 | 10.0 | | | 5 | | 266 | 291 | 320 |
| SPL-09 | 25.0 | 30 | 30.0 | 5.0 | | 5 | 5 | | 249 | 272 | 315 |
| SPL-10 | 25.0 | 30 | 30.0 | 5.0 | | 10 | | | 236 | 253 | 294 |
| SPL-11 | 30.0 | 25 | 30.0 | 4.8 | 5.2 | 5 | | | 237 | 257 | 296 |
| SPL-12 | 20.0 | 35 | 30.0 | 4.8 | 5.2 | 5 | | | 204 | 225 | 269 |
| SPL-13 | 17.0 | 38 | 30.0 | 4.8 | 5.2 | 5 | | | 197 | 214 | 260 |
| SPL-14 | 17.0 | 43 | 30.0 | | 5.0 | 5 | | | 177 | 192 | 233 |
| SPL-15 | 20.0 | 45 | 35.0 | | | | | | 163 | 172 | 208 |
| SPL-16 | 17.0 | 43 | 40.0 | | | | | | 169 | 180 | 213 |
| SPL-17 | 40.0 | 20 | 40.0 | | | | | | 218 | 233 | 266 |
| SPL-18 | 20.0 | 45 | 30.0 | | | 5 | | | 169 | 182 | 216 |
| SPL-19 | 45.0 | 20 | 30.0 | | | 5 | | | 224 | 232 | 262 |
| SPL-20 | 40.0 | 25 | 35.0 | | | | | | 212 | 224 | 259 |
| SPL-21 | 18.0 | 43 | 34.0 | | 5.0 | | | | 167 | 183 | 221 |
| SPL-22 | 40.0 | 35 | 25.0 | | | | | | 235 | 255 | 300 |
| SPL-23 | 30 | 45 | 25 | | | | | | 216 | 236 | 281 |
| SPL-24 | 0.0 | 40 | 40.0 | 20.0 | | | | | 221 | 240 | 270 |

EXAMPLE 2

(Manufacture of Glass-Resin Composite Material)
An SPL-21 glass powder (particle diameter: 3 µm) described in Table 1 and a flaky polystyrene resin were blended at a volume ratio of 1:1 and composited by a double screw kneader. In the kneader, the temperature for keeping heating was set to 250° C. and the screw rotational speed was set to 40 rpm/min.

Figure 2:
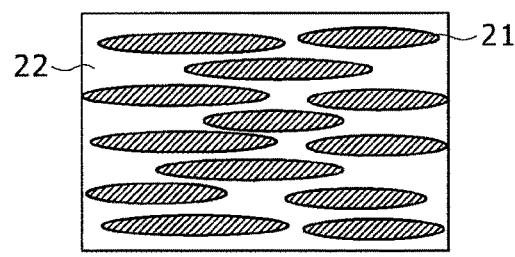
[FIG. 2] is a schematic view of a cross section SEM image of a composite resin material.

FIG. 2 is a schematic view of a cross section SEM image of a composite material. A black contrast area is a glass 21 and a white contrast area is a resin 22. The glass powder is softened and fluidized by heating and molten glass joined to each other to a grow. Since the glass particles tend to adhere with other glass particles present in the vicinity upon softening, the shape of the glass 21 after the softening is different when heated depending on the state of the glass powder dispersed in the resin. Accordingly, while the glass 21 is illustrated in FIG. 2 as a state grown into an elongate rod shape, the glass can take various forms such as a substantially spherical shape, a meandering shape, or a mesh-like shape.

While the glass is dispersed in the resin in this example, a composite material in which the resin is dispersed in the glass can be manufactured by the same preparing method when the amount of glass is increased relative to the resin.

The resin may be either crystalline or amorphous, includes; for example, polyethylene, polyvinyl chloride, polypropylene, polystyrene, polyvinyl acetate, ABS resin, AS resin, acryl resin, polyacetal resin, polyimide, polycarbonate, modified polyphenylene ether (PPE), polybutylene terephthalate (PBT), polyarylate, polysulfone, polyphenylene sulfide, polyether ether ketone, polyimide resin, fluoro resin, polyamideimide, polyether ether ketone, epoxy resin, phenolic resin, polyester, and polyvinyl ester.

The condition for the composition is that the glass is softened and fluidized at or lower than the heat decomposition temperature of the resin, etc. and the difference between the glass transition point of the glass and the glass transition point of an amorphous resin (melting point of a crystalline resin) is preferably within 100° C. This is because a thermal distortion caused by the difference of heat expansion coefficients between both of them increases, cracks tend to generate at the boundary between them, and no satisfactory adhesion between them can be ensured if the temperature difference exceeds 100° C.

As to be described in the following example, since the composite material is manufactured by mixing and heating glass particles and flakes of resin, etc., when the mixing ratio of the resin, etc. is high, it is necessary that the temperature difference between the softening point of the glass and the glass transition point of the resin, etc. (melting point of crystalline resin) is not excessively large within about 100° C. for fusing flakes to each other.

Further, while the resins described above can be used as the resin, since the thermoplastic resins, among the resins in particular, can be softened and fluidized by heating also after manufacture of the composite materials, fractures or defects of the composite material can be repaired.

Further, various shapes of molded products can be manufactured simply by compositing the glass and the resin and injecting them into a mold by using an injection molding machine. Further, since the glasses of this example are semiconductors and the manufactured molded products have electric conductivity to some extent, they can be used also as packages for various kinds of electronic devices having antistatic function.

Oxygen permeability and vapor permeability, of the obtained composite materials were evaluated.

The oxygen permeability was measured by using an oxygen permeability measuring apparatus (OX-TRAN® 2/20) manufactured by MOCON Co. in USA under the condition at a temperature of 30° C. and at a humidity of 90% RH and under the condition of a pressure difference of 0.1 MPa. The measuring limit of the apparatus is 0.01 cc/m²/day.

Vapor permeability was measured by using a vapor permeability measuring apparatus (PERMATRAN® 2/20) manufactured by MOCON Co. in USA under the condition at a temperature of 30° C. and at a humidity of 90% RH and under the condition of a pressure difference of 0.1 MPa. The measuring limit of the apparatus is 0.01 g/m²/day.

Oxygen permeability and the vapor permeability of the composite material of the invention were less than the measuring limit of the apparatus. Further, composition with a rubber instead of the resin is also possible, and fluoro rubber, silicone rubber, and acryl rubber are suitable as the rubber.

EXAMPLE 3

Figure 3:
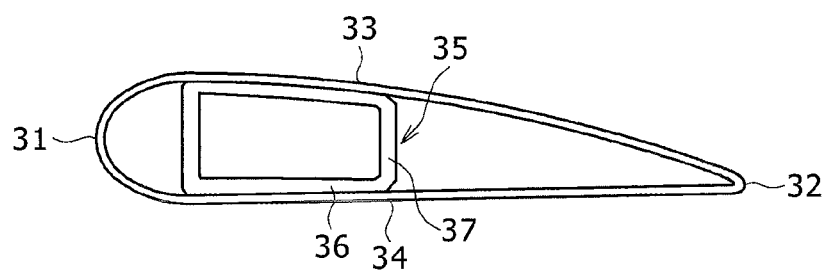
[FIG. 3] is a cross sectional view of a wind turbine blade structure made of a fiber reinforced resin in a direction perpendicular to a longitudinal axis of a blade.

FIG. 3 is a cross sectional view of a wind turbine blade structure made of a fiber reinforced resin in a direction perpendicular to a longitudinal axis of a blade.

A blade comprises an outer plate referred to as an upper skin 33 and a lower skin 34 that connect a front edge 31 and a rear edge 32. The inside covered by the outer plate defines a vacant space for weight reduction. A box-shaped beam member referred to as a spar 35 having a layered structure is provided for reinforcement between the upper skin 33 and the lower skin 34 over the longitudinal direction of the blade. Further, the spar 35 comprises flange parts 36 in contact with the inner circumferential surface of the upper skin 33 and the lower skin 34, and a web 37 that connects upper and lower flange parts of the blade. The spar 35 may be in a C-shape, I-shape, or plate-shape in addition to the box-like shape described above. The upper skin 33 and the lower skin 34 are preferably made of a fiber reinforced resin (FRP) due to the reason of reducing the weight and providing corrosion resistance. A glass fiber reinforced resin (GFRP) in which glass fibers are impregnated with a matrix resin is used in this example. The glass fibers are fibrous glass mainly comprising silicon dioxide ($SiO_2$) and having a fiber diameter of about 5 to 20 μm.

Figure 4:
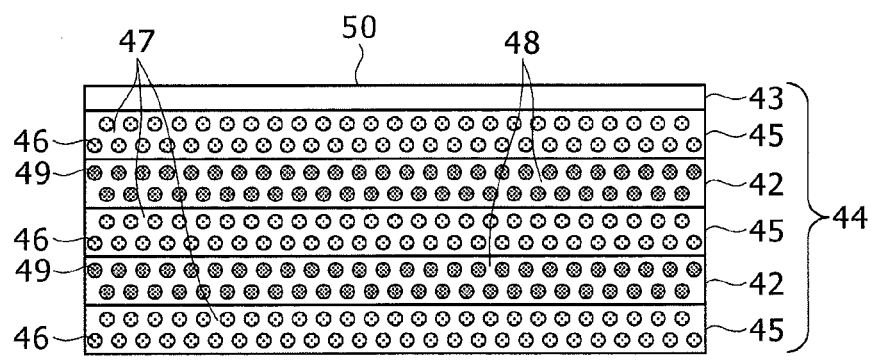
[FIG. 4] is a fragmentary cross sectional view for an upper portion of a flange.

FIG. 4 is a fragmentary cross sectional view of an upper flange 36 (flange 50). A composite layer 44 is formed integrally by carbon fiber layers 42 and glass fiber layers 45 laminated alternately, and an adhesive layer 43. The adhesive layer 43 is bonded with the upper skin (not illustrated). In glass fibers layer 45, a matrix resin 47 is impregnated in the glass fiber 26. In the carbon fiber layer 42, a resin is impregnated in carbon fibers 49.

The resin forming the carbon fiber layer 42 and the glass fiber layer 45 includes a thermosetting resin, for example, an epoxy resin, a vinyl ester resin, and an unsaturated polyester resin. The composite material of this example is used for the matrix resin 47 of the upper skin 33, the lower skin 34, and the glass fiber layer 45. Since the glass fiber 46 comprises $SiO_2$ as a main ingredient, it is not softened at a temperature where the glass in the matrix resin 47 is softened and keeps a function as a reinforcing material. The glass in the matrix resin 47 is in partial contact with the glass fibers 46. When the glass in the matrix resin 47 is softened and bonded to the glass fibers 46, the glass in the matrix resin 47 and the glass fibers 46 are bonded closely and the bonding strength at the boundary between the glass fibers 46 and the matrix resin 47 is improved greatly compared with the case of using a usual resin matrix. Further, when the composite material of this example is used also to the matrix resin of the carbon fiber layer 42, since both of the glass in the matrix resin 47 and the glass in the matrix resin 48 are softened and bonded, the glass fiber layer 45 and the carbon fiber layer 42 can also be bonded closely.

When a 3-point bending fatigue test was performed (Measuring method: According to JIS K 7118 and K 7082) by a 70% distortion amount of the static strength of the spar 35, lowering of the bending rigidity was not observed even after several $10^6$ times of cycles. In a case where the matrices of the upper skin 33, the lower skin 34, and the glass fiber layer 42 is a usual resin, cracks were observed in the layer 42 of the lower flange at several $10^5$ times of cycles and the bending rigidity was lowered to 90% after $10^6$ times of cycles.

Further, since the glass of this example is a semiconductor and the upper skin 33 and the lower skin 34 have an electric conductivity to some extent, the damages due to current passage caused by thunderbolt struck, etc. are reduced, which is advantageous in view of safety.

As the method of manufacturing the blade structure made of FRP of the invention, any of known molding techniques, for example, a prepreg method, a resin transfer molding (RTM) method, a drawing method, a filament winding method, a hand layup method, etc. can be used.

Further, a glass powder, a resin binder, and a solvent were mixed to prepare a slurry used for spraying (coating material). Nitrocellulose was used as the resin binder and butyl carbitol acetate was used as the solvent. The slurry was coated by spraying on the surface of a blade and heated and kept at a glass transition point or higher thereby capable of forming a protection film. This can improve the weather resistance of the blade and can provide electric conductivity.

LIST OF REFERENCE SIGNS 21 glass
22 resin
31 front edge
32 rear edge
33 upper skin
34 lower skin
35 spar
36, 50 flange
37 web
42 carbon fiber layer
43 adhesive layer
44 composite layer
45 glass fiber layer
46 glass fiber
47, 48 matrix resin
49 carbon fiber

The invention claimed is:

1. A composite material comprising a resin or a rubber and an oxide glass, wherein
the resin or the rubber is dispersed in the oxide glass, or the oxide glass is dispersed in the resin or the rubber;
the oxide glass contains Ag and at least two of Te, P, and V;
the oxide glass is a lead-free glass;
the temperature difference between the softening point of the oxide glass and the glass transition point of the resin or the rubber is within 100° when the resin or rubber comprises an amorphous portion and not a crystalline portion;
the temperature difference between the softening point of the oxide glass and the melting point of the resin or the rubber is within 100° C. when the resin or the rubber comprises a crystalline portion; and
the resin comprises one of polyethylene, polyvinyl chloride, polypropylene, polystyrene, polyvinyl acetate, ABS resin, AS resin, polyacetal resin, polyimide, polycarbonate, modified polypheylene ether (PPE), polybutylene terephthalate (PBT), polyarylate, polysulfone, polyphenvlene sulfide, polyether ether ketone, polyimide resin, fluoro resin, polyamideimide, polyether ether ketone, epoxy resin, phenolic resin, polyester, and polyvinyl ester.

2. The composite material according to claim 1, wherein the oxide glass contains Te, V, and Ag.

3. The composite material according to claim 2, wherein the oxide glass contains $Ag_2O$, $V_2O_5$, and $TeO_2$, and the content of $Ag_2O$, $V_2O_5$, and TeO2 in total is 75 mass % or more.

4. The composite material according to claim 3, wherein the oxide glass contains 10 to 60 mass % of $Ag_2O$, 5 to 65 mass % of $V_2O_5$, and 15 to 50 mass% of TeO2.

5. The composite material according to claim 4, wherein the $Ag_2O$ content of the oxide glass is 2.6 times or less the $V_2O_5$ content.

6. The composite material according to claim 5, wherein the sum of the $Ag_2O$ content and the $V_2O_5$ content of the oxide glass is 40 to 80 mass %.

7. The composite material according to claim 1 further comprising an organic solvent, wherein the composite material and the organic solvent form a coating material.

8. A glass fiber reinforced resin in which the composite material according to claim 1 and glass fibers are composited.

9. An electric conductive package comprising the composite material according to claim 1.

10. A blade for wind power generation comprising the glass fiber reinforced resin according to claim 8.

* * * * *